(12) United States Patent
Gutierrez et al.

(10) Patent No.: US 11,695,972 B2
(45) Date of Patent: Jul. 4, 2023

(54) USE OF IN-BAND DATA TO CORRECT SCHEDULE DRIFT

(71) Applicant: Roku, Inc., San Jose, CA (US)

(72) Inventors: Alejandro Gutierrez, Dallas, TX (US); John E. Sormark, Redwood City, CA (US); Shashank C. Merchant, Sunnyvale, CA (US); Brian P. Jentz, Buxton (GB); John L. Haynes, III, Sandy, UT (US)

(73) Assignee: Roku, Inc., San Jose, CA (US)

( * ) Notice: Subject to any disclaimer, the term of this patent is extended or adjusted under 35 U.S.C. 154(b) by 184 days.

(21) Appl. No.: 17/305,613

(22) Filed: Jul. 12, 2021

(65) Prior Publication Data
US 2022/0264162 A1    Aug. 18, 2022

Related U.S. Application Data

(60) Provisional application No. 63/200,093, filed on Feb. 12, 2021.

(51) Int. Cl.
*H04N 21/234* (2011.01)
*H04N 21/262* (2011.01)

(52) U.S. Cl.
CPC . *H04N 21/23424* (2013.01); *H04N 21/23418* (2013.01); *H04N 21/26241* (2013.01)

(58) Field of Classification Search
CPC ................................................ H04N 21/23424
See application file for complete search history.

(56) References Cited

U.S. PATENT DOCUMENTS 9,961,377 B1 * 5/2018 Miner ................ H04N 21/6143

* cited by examiner

*Primary Examiner* — Michael H Hong
(74) *Attorney, Agent, or Firm* — Sterne, Kessler, Goldstein & Fox P.L.L.C.

(57) ABSTRACT

A method and system to help control when to monitor for presence of replaceable advertisements in a media stream. An example method includes determining a time offset based at least on a difference between (i) a time of occurrence of a content event in a media stream as indicated by data carried in-band with the media stream and (ii) a time of occurrence of the content event in the media stream as indicated by schedule data that is not carried in-band with the media stream. Further, the method includes applying the determined time offset as a basis to adjust a scheduled time of an advertisement in the media stream, and using the adjusted scheduled time of the advertisement in the media stream as a basis to control when to monitor for presence of a replacement advertisement in the media stream.

20 Claims, 5 Drawing Sheets

USE OF IN-BAND DATA TO CORRECT SCHEDULE DRIFT

REFERENCE TO RELATED APPLICATIONS

This application claims priority to U.S. Provisional Patent Application No. 63/200,093, filed Feb. 12, 2021, the entirety of which is hereby incorporated by reference.

BACKGROUND

In a typical linear broadcast system, a producer or other provider of audio and/or video media content transmits a linear media stream representing the media content to one or more media distribution points, and each media distribution point in turn transmits the media stream to various end-user media clients for presentation. By way of example, a national television (TV) broadcaster in the United States may provide a digital television broadcast feed carrying a media stream to various multi-channel video program distributors (MVPD), such as cable or satellite TV head-ends, that serve respective market areas throughout the country, and each MVPD may in turn transmit the media stream to various end-user reception devices, such as set top boxes and/or TVs, in the MVPD's market area for playout to end users.

The media stream of such a broadcast feed could include both program content and ad content. For instance, the media stream could include television programming with interspersed commercial breaks, and each commercial break could include one or more ads. As the media stream gets distributed ultimately to end-user devices, the end-user devices could thus play out both the program content and the interspersed ads.

SUMMARY

A dynamic ad replacement (or "dynamic ad insertion" (DAI)) system can operate to facilitate dynamic replacement of certain ads in such a media stream, so that when an end-user device plays out the media stream, the device would play out a replacement ad in place of an originally included ad. The system could thereby help tailor advertisement to a particular market, consumer or the like.

Such a system could be configured to facilitate dynamic ad replacement at various points in the media distribution path. By way of example, the system could operate at or in association with an MVPD, to facilitate replacement of national ads with local ads specific to the MVPD's local market area, so that end-user devices served by the MVPD would play out more-locally-relevant ads in place of the national ads. And as another example, the system could operate at or in association with end-user devices, perhaps as a cloud-based system that engages in broadband control communication with the end-user devices, to facilitate targeted ad replacement based on user demographics or the like.

A representative dynamic ad replacement system could make use of digital fingerprinting technology to identify the presence of an ad within a linear media stream and to coordinate replacement of that identified ad.

In practice, the media stream at issue could define a sequence of frames of media content (e.g., digital video frames) that an end-user device could process for presentation to a user. Over the course of the media stream, subsequences of those frames would thus represent program content and other subsequences of the frames would represent interspersed ads.

To facilitate dynamic ad replacement in this context, an ad recognizer operating at or in association with a linear TV broadcast head-end (e.g., MVPD) or other point in the media distribution path could monitor the media stream in real-time during its distribution, in an effort to detect the presence in the media stream of any of various ads that could be replaced. Upon detecting the presence in the media stream of a replaceable ad, the ad-recognizer could then responsively output a trigger for dynamic replacement of that ad.

To do this, the ad recognizer could have access to an ad-inventory database that contains digital fingerprints respectively representing the frames of each of various ads that are candidates to be replaced. For instance, for each such ad, the database could contain a sequence of digital fingerprints representing the sequence of frames of the ad and could correlate that set of fingerprints with a unique identifier of the ad and perhaps with other associated metadata.

Further, in real-time as the media stream is being distributed, a fingerprint-generation engine operating at or in association with the head-end or other point in the media distribution path could regularly generate digital reference fingerprints representing the media stream. Namely, for each frame of the media stream being distributed, the engine could programmatically generate a reference fingerprint that represents the frame. And as the engine generates this sequence of reference fingerprints, the engine could store the generated reference fingerprints, with associated metadata such as frame timestamps and media-stream identification, in a reference-fingerprint database.

In real-time as this reference-fingerprint data is being established, the ad recognizer could then conduct fingerprint matching, comparing the latest generated digital reference fingerprints with the digital ad fingerprints in the ad-inventory database. And if and when the ad recognizer detects with sufficient confidence that a subsequence of the generated digital reference fingerprints matches a subsequence (e.g., starting subsequence) of the digital ad fingerprints representing a given ad, the fingerprint-matching server could output a trigger for dynamic replacement of the detected ad in the media stream.

In an example where dynamic ad replacement would occur at the MVPD, the output trigger could cause a server operating at or in association with the MVPD to dynamically replace the ad. For instance, starting at the frame of the media stream matching the first frame of the detected ad, the server could substitute frames of the media stream, i.e., frames of the detected ad, with frames of a replacement ad. As the modified media stream then passes to end-user devices served by the MVPD, those devices would therefore play out the replacement ad instead of the detected underlying ad.

Alternatively, in an example where dynamic ad replacement would occur at an end-user device such as a set top box or TV, the output trigger could cause a server to engage in signaling with the end-user device, to invoke the ad replacement. This signaling between the server and the end-user device could occur over a broadband connection and could take advantage of a several-second delay in the transmission of the media stream to the end-user device. Namely, with broadband communication during that delay, the server could give the end-user device advanced notice of the upcoming ad-replacement opportunity in the media stream that the end-user device is processing for presentation, so the end-user device could have enough time to prepare for and carry out the ad replacement at the appropriate time in the media stream.

Through this signaling, the server could inform the end-user device of an upcoming time point (e.g., frame timestamp) where the underlying ad starts in the media stream, and could direct the end-user device to replace the ad with a replacement ad. Further, through this signaling, the server could provide the end-user device with a set of the reference fingerprints leading up to and through the underlying ad. And the end-user device could then generate query fingerprints of the media stream being processed and could match those generated query fingerprints with the provided reference fingerprints, to help identify the time point where the end-user device should start the ad replacement and perhaps also to help ensure that media stream continues to the be the same media stream (e.g., that no channel change occurs), as a condition for the end-user device starting and/or continuing with the dynamic ad replacement.

One technical issue in such a system relates to the timing of the ad recognizer monitoring for and detecting the presence of replaceable ads. In practice, the ad recognizer may be responsible for monitoring for the presence of replaceable ads in many media streams (e.g., numerous TV channels or streaming media channels), and the ad-inventory database may contain ad-fingerprint data representing many candidate replaceable ads. As a result, it could be very processor and time intensive for the ad recognizer to constantly monitor for the presence of replaceable ads in the media streams.

One way to help address this issue is to have the ad recognizer monitor for the presence of replaceable ads just at times when those ads are scheduled to be present, rather than monitoring for presence of replaceable ads at all times.

To facilitate this, the ad recognizer could receive schedule data that specifies on a per media stream basis (e.g., per channel basis) when replaceable ads are scheduled to be present. For instance, broadcasters or other content programmers could generate and provide such schedule data, on a daily or other basis, specifying the scheduled times of day of various content events, such as the scheduled start times of ads or ad breaks, the scheduled end times of ads or ad breaks, the scheduled start times of programs, and the scheduled end times of programs. An example system could then include an event manager or other computer system that receives that schedule data and passes along to the ad recognizer at least the scheduled times of ads per media stream, to enable the ad recognizer to focus its analysis accordingly.

Without limitation, an example of such schedule data could include an XML file that lists such content events in order of their occurrence in the media stream, specifying for each content event both an event identifier and an epoch time when the identified content event is scheduled to occur in the media stream. For instance, for each of various ads scheduled to appear in the media stream, the schedule data could specify a respective ad-identifier, a respective start time of the ad, and a respective end time of the ad.

In practice, there could be some minor variation between the scheduled time of presence of an ad in a media stream and the actual time of presence of the ad in the media stream. And to help account for this minor time variation, the ad recognizer could treat the scheduled time of presence of an ad as defining a range of uncertainty around the scheduled time, such as a 5 minute range that extends from 2 minutes before the scheduled time to 3 minutes after the scheduled time, for instance.

The ad recognizer could thus refer to this schedule data determine when replaceable ads are likely to be present in a media stream, and the ad-recognizer could accordingly limit to those times its monitoring for presence of replaceable ads in the media stream. With a 5-minutes time range defined respectively for each of various particular ads as noted by way of example above, for instance, the ad recognizer could monitor the media stream for the presence of replaceable ads just during those 5-minutes time ranges, avoiding the need to conduct that analysis at other times.

Unfortunately, however, another technical issue that can arise with such an arrangement is that timing of ad appearance in a media stream could drift substantially from the timing indicated by the schedule data, perhaps far more than 2-3 minutes given the example time range. This could happen for various reasons, such as if the media stream represents a sport event or other live event with unpredictable and varying timing, or if a broadcast control-room operator makes last-minute changes in timing of ad insertion.

When this happens, the actual timing of when ads appear in the media stream could be so far off from what the schedule data indicates that the ad recognizer may altogether fail to detect the presence of one or more replaceable ads in the media stream—thus missing out on potentially valuable ad-replacement opportunities.

For instance, if the schedule data specifies that at 2:00 p.m. there will be a replaceable ad in the media stream, the ad recognizer may responsively monitor for presence of that ad in the media stream for the uncertainty period ranging from 1:58 p.m. to 2:03 p.m. But if the ad actually airs at 1:45 p.m., then the ad-recognizer would not yet have started to look for that ad at that time and therefore would not detect the presence of the ad in the media stream, thus missing the opportunity to trigger replacement of that ad. Further, this timing problem could create a domino effect, where the timing of each subsequent ad is off from its scheduled time by at least that same difference in time.

The present disclosure provides a technical mechanism that could help to address this schedule-drift issue. In accordance with the disclosure, a computing system will monitor to detect the presence of such schedule drift and, upon detecting the schedule drift, will then cause application of a time offset to help better align the schedule data with actual timing of ads in the media stream. Without limitation, the computing system that carries out this process could comprise the ad recognizer, the event manager, and/or an associated system.

The computing system could determine the extent of schedule drift by comparing, for each of various scheduled content events, (i) the scheduled time of occurrence of the content event and (ii) the actual time of occurrence of the content event as indicated by in-band content-event-timing data carried with the media stream itself.

Without limitation, an example of such in-band content-event-timing data is data in accordance with the Society of Cable and Telecommunications Engineers (SCTE) standards, e.g., SCTE 104, SCTE 224, and/or SCTE 35. Such SCTE data could be carried with the media stream by being carried in transport-stream packet headers and/or within the media payload, perhaps in the form of ancillary data (e.g., vertical ancillary data (VANC)) embedded in the serial digital interface (SDI). Further, the SCTE data could take the form of an XML data set and could specify for each content event both the time of occurrence of the content event other associated metadata. For instance, where the SCTE data is included in or with a particular frame of the media stream, the SCTE data could have a pre-roll field that carries a frame-accurate indication of which upcoming frame (e.g., how many frames ahead from the SCTE data) is where the content event occurs. Further, the SCTE data could include identification information such as a universal program ID (UPID) or advertisement ID (Ad-ID), among other possibilities Per the present disclosure, the computing system could refer to the schedule data to determine the scheduled time of occurrence of a particular content event in a media stream. Further, the computing system could refer to the in-band content-event-timing data to determine an actual or in-band-indicated time of occurrence of that particular content event as indicated by that in-band content-event-timing data. And the computing system could compute a difference between those two times, with the difference defining a representative extent of schedule drift. In addition, the computing system could perform this analysis for each of multiple content events over a period of time and, based on those multiple analyses, could compute an average or other representative measure of the schedule drift.

The computing system could start to compute this schedule drift in response to the computing system detecting occurrence of a trigger condition. For example, the computing system could monitor for a situation where the ad recognizer has not recognized the presence of an ad for a threshold period of time (e.g., in a given media stream or more generally), with the threshold set based on an historical rate of ad detection for instance, and could deem occurrence of that situation to mean that something is wrong with the ad-recognition process, thus constituting a trigger for correcting schedule drift. And as another example, the computing system could, from time to time, compare scheduled and in-band-indicated times of content-event occurrence, to determine if schedule drift exists. In response to at least one of these and/or one or more other trigger conditions, the computing system could then work to determine the extent of schedule drift as noted above for instance.

Upon determining the extent of schedule drift, the computing system could then apply an offset to help better align the schedule data with actual timing of content events in the media stream. The offset could be a time bias that helps to reverse the schedule drift. For instance, if the computing system determined that content events have been actually occurring in the media stream 15 minutes earlier than the schedule data indicates, then the computing system could change scheduled times of subsequent content events to be 15 minutes earlier than the schedule indicates.

Application of this offset could involve generating revised schedule data including the content-event timing as changed by the offset, and providing the revised schedule for reference by the ad recognizer. Alternatively or additionally, application of the offset could involve causing the ad recognizer to apply the offset as a bias to the scheduled ad times specified by the schedule data. Other implementations could be possible as well.

Optimally, correcting schedule drift may provide financial benefit by helping to ensure successful performance of valuable ad replacement. Further, correcting schedule drift could help to avoid replacing the wrong instance of a given ad, such as where the same ad appears another time in the same media stream and where the schedule drift causes the ad recognizer to erroneously detect and trigger replacement of that other instance of the ad.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
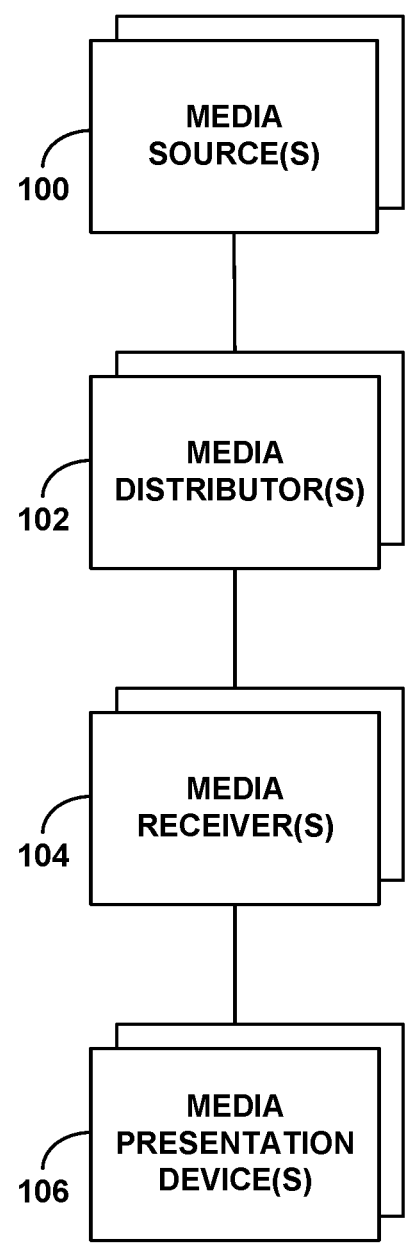
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media sources 100 (e.g., broadcasters, web servers, etc.), one or more media distributors 102 (e.g., multi-channel distributors, such as cable providers, satellite providers, over-the-air broadcast providers, web aggregators, etc.), one or more media receivers 104 (e.g., cable receivers, satellite receivers, over-the-air broadcast receivers, computers or other streaming media receivers, etc.), and one or more media presentation devices 106 (e.g., televisions or other display devices, loudspeakers or other audio output devices, etc.)

Without limitation, the media sources 100 could be national broadcasters, such as ABC, NBC, CBS, FOX, HBO, and CNN, or any of various streaming-channel providers, among other possibilities. Further, the media distributors 102 could be local affiliates and/or other local content distributors serving specific designated market areas (DMAs), or streaming-channel distributors such as Roku, Inc., or the like. And media receivers 104 and media presentation devices 106 could then be associated devices or applications, possibly situated at customer premises, such as homes or business establishments.

With this or other arrangements, the media sources 100 could deliver media streams to the media distributors 102 for distribution to receivers 104 at customer premises, and the media distributors 120 could distribute the media streams to the receivers 104 as particular channels of content (e.g., particular frequencies, particular streaming media sessions, or other defined channels). Each receiver 104 could then respond to user input or one or more other triggers by tuning to or otherwise starting to receive a selected channel and outputting to a media presentation device 106 the media stream of that channel. And the media presentation device 106 could receive and render that media stream (e.g., displaying or otherwise presenting content of the media stream) for consumption by one or more end users.

By way of example, a representative media presentation device 106 could be a television situated at customer premises, which could be coupled by an HDMI cable with a cable-TV set top box, and the set top box could be coupled through a local distribution network with a cable-TV head end that distributes media streams of various television channels provided by national and/or local broadcasters. In this arrangement, the television could regularly receive a media stream via HDMI from the set top box, and the set top box could tune to a particular channel from the head end in response to user input, so that the media stream arriving at the television would then be the media stream of the user-selected channel.

And as another example, a television situated at customer premises could alternatively be connected by an HDMI cable with a streaming-media receiver such as a ROKU brand digital media player, or a computer or other device, which could be in network communication with a streaming-media server of a virtual multichannel video program distributor (virtual-MVPD) that distributes various channels of content. In this arrangement, the television could regularly receive a media stream via HDMI from the streaming-media receiver, and the streaming-media receiver could work with the streaming-media server to cause the streaming-media server to deliver to the streaming-media receiver a particular user-selected channel, which the streaming-media receiver could output in its media stream to the television. Thus, here too, the media stream arriving at the television could likewise be the media stream of the user-selected channel.

As noted above, each of various such media streams could contain both program content and ad content. For instance, each such media stream could carry television programming, movies, or other media content with interspersed commercial breaks including ads. Further, it may be useful to implement DAI with respect to such media streams, to dynamically replace particular ads with replacement ads, possibly targeted to specific markets and/or end-users.

Figure 2:
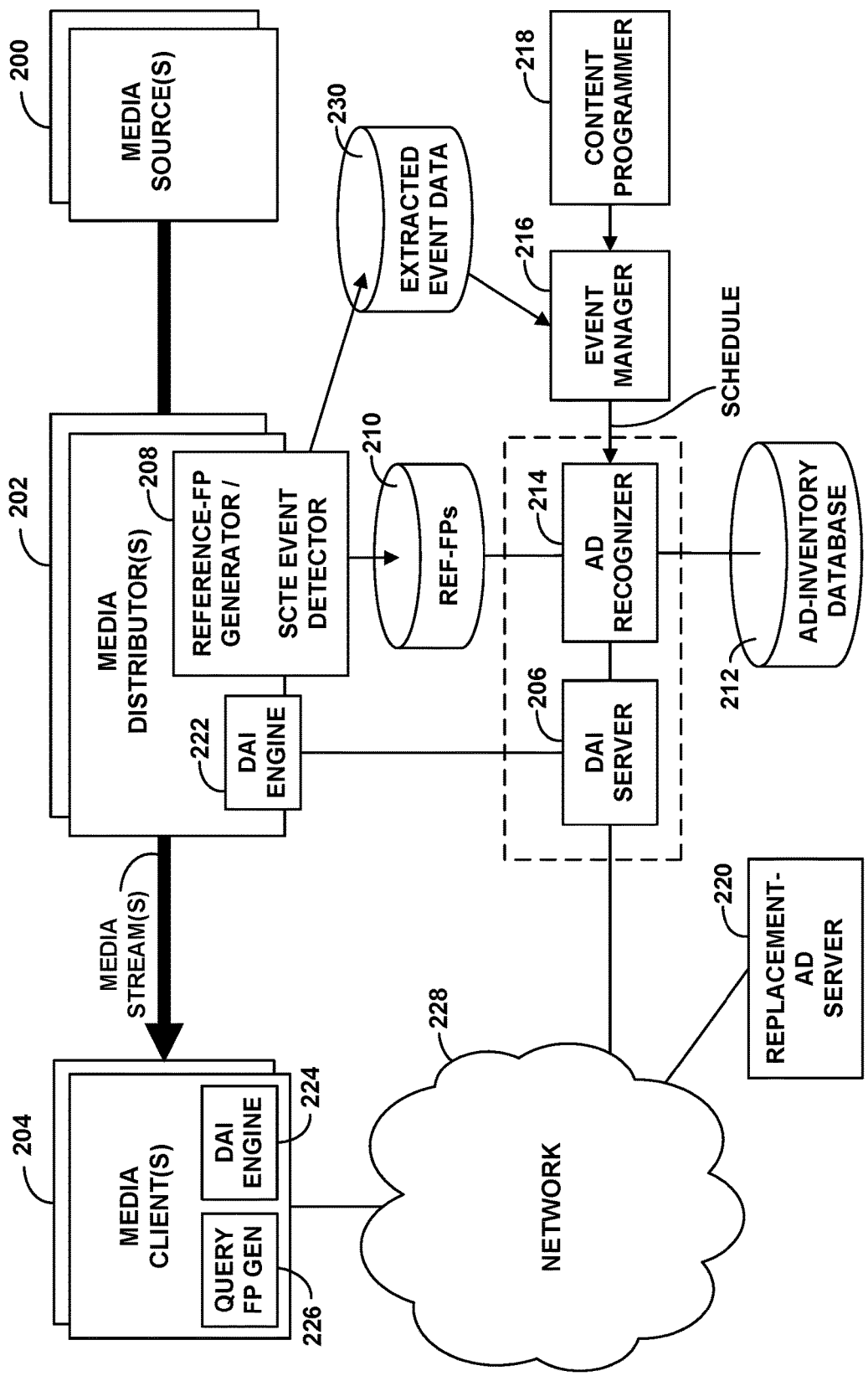
FIG. 2 is another simplified block diagram of an example system in which various disclosed principles can be applied.

FIG. 2 illustrates more specifically an example system in which DAI or other such dynamic content modification could be implemented.

FIG. 2 shows at its top a representative media delivery system similar to that shown in FIG. 1, with media streams being provided by representative media sources 200 and distributed by representative media distributors 202 for distribution to media clients 204 such as receivers and/or media presentation devices, which might be at customer premises. Each of various such media streams could be a linear broadcast feed and/or a streaming media channel, among other possibilities, and various media clients 204 could receive such media streams directly or indirectly from various media distributors 202 through any of a variety of distribution channels, such as but not limited to cable, satellite, terrestrial over-the-air broadcast, broadband streaming, or others now known or later developed.

In an example implementation, the media content of each media stream could define a sequence of digital frames of media content (e.g., video frames, each being a respective image or the like) that media clients 204 could process to facilitate presentation to users. For instance, a media source 200, media distributor 202, and/or other entity might broadcast, stream, or otherwise provide such a sequence of frames encapsulated in a packet-based transport stream for receipt by receivers, and the receivers might receive the transport stream, extract the sequence of frames from the transport stream, and output the sequence of frames for receipt and rendering by media presentation devices.

Further shown in FIG. 2 are components of an example DAI system, which could operate to facilitate DAI as discussed herein.

As shown, without limitation, the example DAI system could include a DAI server 206, which could coordinate dynamic ad replacement. Further, the DAI system could include, perhaps respectively at each of various media distributors 202, a reference-fingerprint-generation engine 208, which could generate and provide reference fingerprints representing media streams that are en route to media clients 204. And the DAI system could include a reference-fingerprint database 210, which could store the generated reference fingerprints.

In addition, the DAI system could include an ad-inventory database 212, which could store fingerprints representing ads that are subject to dynamic replacement. And the DAI system could include an ad recognizer 214, which could operate as noted above to compare reference fingerprints with ad fingerprints so as to detect the presence of replaceable ads in media streams being distributed. Further, the DAI system could include an event manager 216 which could operate as noted above to receive schedule data from a content programmer 218 and to provide to the ad recognizer 214 at least scheduled timing information as to the presence of ads in the media streams. And the DAI system could include a replacement-ad server 220, which could serve replacement ads for insertion in place of replaceable ads.

In an example implementation, the DAI system could also include server-side components to facilitate applying dynamic ad replacement as to ads in media streams en route to media clients 204 and client-side components to facilitate applying dynamic ad replacement as to ads in media streams being processed for presentation by media clients 204. For instance, the DAI system could include, perhaps respectively at each of various media distributors 202, a DAI engine 222 that could carry out server-side dynamic ad replacement. And the DAI system could include, perhaps respectively at each of various media clients 204, a DAI engine 224 that could carry out client-side dynamic ad replacement, as well as a query-fingerprint-generation engine 226 that could generate query fingerprints representing media content being processed for presentation.

As further shown in FIG. 2, each of various media clients 204 could be interconnected with a network 228 that provides connectivity with various server-side components such as the DAI server 206 and the replacement-ad server 216. For instance, each media client 204 could sit as a node on a local area network (LAN), having an assigned Internet Protocol (IP) address on the LAN and the LAN having an IP address on the network 228. And the various server-side components could be accessible at predefined addresses on network 228. Thus, each media client 204 could engage in data communication with various server-side components via the network 228 while the media client 204 is processing a media stream for presentation.

The example arrangement of FIG. 2 may implement server-side and/or client-side dynamic ad replacement as discussed above for instance, using fingerprint matching as a basis to detect the presence of a replaceable ad in a media stream, and then dynamically replacing that ad with a replacement ad.

To facilitate dynamic ad replacement, the example DAI system could regularly populate reference-fingerprint database 210 with reference fingerprint data. For instance, for each of one or more media streams being distributed by a media distributor 204, the reference-fingerprint-generation engine 208 could programmatically generate digital reference fingerprints on a per-frame basis or other ongoing basis and could establish for each such reference fingerprint associated metadata including for instance an identity of the media stream and a reference timestamp indicating a time point of the associated frame in the media stream. And the reference-fingerprint-generation engine 208 could provide these reference fingerprints and associated metadata for storage in the reference-fingerprint database 210 in a manner that allows ready searching and access.

An example digital fingerprinting process as to video content could involve establishing a unique representation of luminosity and/or other video characteristics per video frame. For instance, for each video frame, the reference-fingerprint-generation engine 208 could programmatically divide the frame into a grid, measure luminosity per grid cell, and generate as a digital reference fingerprint of the frame a bit string in which each bit or series of bits represents luminosity of a respective grid cell or represents a weighted difference between the luminosity of certain defined pairs of the grid cells, among other possibilities. Further, the reference-fingerprint-generation engine 208 could apply this process continually as to each frame, as to each key frame, periodically, or on another defined basis. Other digital fingerprinting processes could be used as well.

In addition, to facilitate fingerprint matching for detecting the presence of replaceable ads, the ad-inventory database 212 could be populated with ad fingerprints generated in a similar manner.

To facilitate server-side DAI as discussed above, the ad recognizer 214 could then regularly compare the fingerprints representing media streams en route to media clients 204 with the ad fingerprints representing replaceable ads, in an effort to find a match that indicates the presence of a replaceable ad in such a media stream. For instance, as reference fingerprints representing the frames of a given media stream that is being distributed by a given media distributor 202 are stored in the reference-fingerprint database 210, the DAI server 206 could search the ad-inventory database for a subsequence of ad fingerprints that match a subsequence of those reference fingerprints.

This fingerprint matching process could involve comparing corresponding portions of the fingerprints with each other to determine whether the portions match exactly or within defined tolerances. For example, the ad recognizer 214 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Other examples are possible as well.

Upon finding with sufficient certainty that the reference fingerprints of the given media stream match ad fingerprints of a replaceable ad, perhaps that a sequence of the reference fingerprints match a sequence of ad fingerprints at the start of the replaceable ad, the ad recognizer 214 could conclude that the ad represented by those ad fingerprints is present in the given media stream and could note from the reference-fingerprint data a timestamp of the ad.

Having detected the presence of a replaceable ad in the given media stream being distributed by the given media distributor 202, the ad recognizer 214 could then trigger dynamic replacement of that ad in the given media stream. For instance, the ad recognizer 214 could signal to the DAI server 206, providing the DAI server 206 with the ad ID and the determined timestamp of the ad, to cause the DAI server 206 to coordinate application of the dynamic ad replacement.

The DAI server 206 could then responsively engage in signaling with a given DAI engine 222 at the given media distributor 202 to note the presence of the replaceable ad and to direct the given DAI engine 218 to replace that ad. And in response, the given DAI engine 218 could splice a replacement ad into the media stream in place of the replaceable ad, so that the media stream being distributed by the given media distributor 202 would carry the replacement ad in place of the replaceable ad. In practice, for instance, the given DAI engine 218 could obtain the replacement ad from the replacement-ad server 220 or another source, and the replacement ad might be targeted to a local market or customer base of the given media distributor 202.

This server-side DAI may require buffering of the media stream at the given media distributor 202 for a period of time sufficient to allow generation of the reference fingerprints representing frames of the media stream, matching of the generated reference fingerprints with the ad fingerprints, and processing of the ad replacement.

To carry out client-side DAI as discussed above, on the other hand, the DAI engine 224 at given media client 204 could interwork with the DAI server 206 and the DAI server 206 could interwork with the ad recognizer 214. In practice, for instance, this process could first involve identifying the media stream that the media client 204 is processing for presentation and could then involve the ad recognizer 214 performing processing as in the server-side implementation to detect a replaceable ad in that media stream. And the process could then involve the DAI server 206 directing the media client 204 to replace that ad with a replacement ad, and the DAI engine 224 accordingly carrying out the ad replacement.

Identifying the media stream that the media client 204 is processing for presentation could take various forms.

For instance, the media client's DAI engine 224 may gain direct knowledge of the identity of the media stream that the media client 204 is processing for presentation, such as if the media client 204 is involved with selecting of that media stream to be presented, or by reading or otherwise ascertaining an identifier of the media stream from in-band data in the media stream or in a transport stream that carries the media stream. And the DAI engine 224 could then transmit that determined identity to the DAI server 206.

Alternatively, if the DAI engine 224 does not have knowledge of the identity of the media stream that the media client 204 is processing for presentation (e.g., if the media client is a TV that is merely receiving a media stream to be rendered, without an included identifier of the media stream), the DAI server 206 could engage in fingerprint-based processing to identify the media stream. For instance, as the media client 204 processes (e.g., receives, transcodes, renders, outputs, or otherwise processes) the media stream for presentation, the query-fingerprint-generation engine 226 could regularly generate digital query fingerprints representing frames of the media stream and could regularly transmit the generated query fingerprints to the DAI server 206 for analysis. And the DAI server 206 could compare those query fingerprints with reference fingerprints in the reference-fingerprint database 210 to find a match, which would indicate that the media stream represented by the matching reference fingerprints is the media stream being processed by the media client 204 for presentation.

Still alternatively, in a scenario where the media client 204 is receiving the media stream from a virtual-MVPD or other entity that has knowledge of the identity of the media stream being received by the media client 204, that virtual-MVPD or other entity could transmit an identity of that media stream to the DAI server 206, with an indication that the media client 204 is processing that media stream for presentation.

Once the DAI server 206 has determined in this or another manner the media stream that the media client 204 is processing for presentation, the DAI server 206 could then signal to the ad recognizer 214 to cause the ad recognizer to monitor for presence of replaceable ads in that media stream. The ad recognizer 214 could then responsively compare the reference fingerprints representing that identified media stream with the ad fingerprints in the ad-inventory database 212. And upon finding with sufficient certainty that ad fingerprints representing frames of a particular replaceable ad match reference fingerprints representing frames of the identified media stream, the ad recognizer 214 could conclude that the replaceable ad represented by those ad fingerprints is present in the given media stream and could note from the reference-fingerprint data a timestamp of the ad.

Having detected the presence of a replaceable ad in the given media stream being processed for presentation by the media client 204, the ad recognizer 214 could then likewise trigger dynamic replacement of that ad in the given media stream. Here too, for instance, the ad recognizer 214 could signal to the DAI server 206, providing the DAI server 206 with the ad ID and the determined timestamp of the ad, to cause the DAI server 206 to coordinate application of the dynamic ad replacement.

In this client-side process, the DAI server 206 could then responsively arrange with the media client 204 for replacement of that ad in the media stream. For instance, the DAI server 206 could transmit to the DAI engine 224 at the media client 204 a directive for the DAI engine 224 to insert a replacement ad in place of the replaceable ad. In or with this directive, the DAI server 206 could specify the timing and other information about the replaceable ad, based on the ascertained metadata. And the DAI engine 224 could work to obtain from the replacement-ad server 216 a replacement ad, perhaps targeted to a user of the media client 204, and could splice that replacement ad into the media stream in place of the replaceable ad, so that the media stream being processed for presentation by the media client 204 will include the replacement ad instead of the replaceable ad.

As with the server-side DAI process, this client-side DAI process may leverage a delay in distribution of the media stream from the media distributor 202 to the media client 204. This delay could be an inherent delay in transmission of the media stream along the media distribution path from the media distributor 202 to the media client and/or could include intentionally inserted delay to help facilitate this process or for other purposes. With this delay, as the media client 204 is processing the media stream for presentation, the DAI server 206 could inform the media client 204 of an upcoming replaceable ad before the media client 204 receives and/or processes that segment of the media stream for presentation, giving the media client 204 advanced notice of that ad-replacement opportunity and time to obtain and insert replacement ad content.

As noted above, the present disclosure addresses the technical problem of scheduled drift, where the schedule data that guides timing of monitoring for presence of replaceable ads is sufficiently offset from the actual timing of ad presence that one or more ad-replacement opportunities may be missed.

As explained above, a possible solution this problem involves using in-band event data as a basis to determine an extent of the schedule drift, and then applying an offset to help better align scheduled ad timing with actual timing of ad presence.

In a non-limiting example implementation, a computing system that carries out this process could include the event manager 216, the ad recognizer 214, and the reference-fingerprint-generation engine (fingerprint engine) 208.

In practice, for instance, as the fingerprint engine 208 generates reference fingerprints of a given media stream that is being distributed, the fingerprint engine 208 could also detect and extract in-band content-event data carried with the media stream, including, respectively for each of various content events, content-event identification information and the in-band-indicated time of occurrence of the content event.

Without limitation, this in-band content-event data could be SCTE data as described above. Such SCTE data could be included in or with a media stream to enable MVPDs to carry out ad replacement, or for other purposes. For instance, a national broadcaster or other content provider could provide a packet-based transport stream that carries media stream including core program content and additionally including a commercial break defining a national ad. Further, per agreements with MVPDs, the national broadcaster could permit each MVPD to replace the included national ad with a local ad specific to the MVPD's market area. And to facilitate this, the national broadcaster could insert into the transport stream one or more SCTE packets or other such data that designate content events such as ad start timing, ad end timing, program start timing, and program end timing. Other reasons for the presence of SCTE data could be possible as well.

Further, other forms of in-band content-event data could be provided as well. For instance, the Advanced Television Systems Committee (ATSC) has likewise developed one or more standards that enable conveying of metadata in-band within a transport stream that carries a media stream from one entity to another. A recent example of such a standard is ATSC 3.0. In alternative implementations, ATSC data or other in-band data could demarcate occurrence of a content event in a media stream being distributed, and the fingerprint engine 208 could detect and extract in-band content-event data carried with the media stream.

The fingerprint engine 208 could detect the presence of this or other such in-band content-event data by monitoring for presence of telltale indication(s) of the presence of such data. For example, if the in-band data is carried in special transport stream packets, the fingerprint engine 208 might look for such packets based on the packets having predefined header values indicating that they carry the in-band data. As another example, if the in-band data is carried as watermarking or the like in the media stream, the fingerprint engine 208 may monitor for the presence watermarks or the like encoded in a data format indicating their presence. Other examples could be possible as well.

The fingerprint engine 208 could conduct this process as to each and every in-band-indicated content event or could conduct this process specifically as to certain such events, such as, for instance (i) ad timing events, such as ad start and/or ad end, (ii) program timing events, such as program start and/or program end, among other possibilities.

As the fingerprint engine 208 extracts this in-band-indicated content-event information, the fingerprint engine 208 could then provide the information for reference by the event manager 216. Without limitation, for instance, the fingerprint engine 208 could publish (e.g., post) the information to an event-data database 230, and the event manager could be subscribed to receive notifications when new event data is added to the event-data database 230. Thus, when the fingerprint engine 208 detects in-band data that indicates occurrence of a content event in a media stream, the fingerprint engine 208 could publish to the event-data database 230 information about that event, including event identification (e.g., along with stream identification) and indicated time of occurrence of the event in the stream, and the event manager 216 could receive that information from the event-data database 230.

Given schedule data provided by a content programmer 218 for instance, and given this in-band-indicated content-event data, the event manager 216 could then perform a comparison on a per-content-event basis between (i) the scheduled time of occurrence of the content event as indicated by the schedule data and (ii) the actual, or approximately actual, time of occurrence of the content event as indicated by the in-band content-event data.

For instance, for each such content event, the event manager 216 could determine from the schedule data the scheduled time of occurrence of the content event and an identifier of the content event. And given the content-event identifier, the event manager 216 could determine from the extracted in-band content-event data the in-band-indicated time of occurrence of that same identified content event. The event manager 216 could then compute a difference between (i) the determined scheduled time of occurrence of the content event and (ii) the in-band-indicated time of occurrence of the content event, with the difference defining a representative extent of schedule drift.

Further, the event manager 216 could perform this analysis for each of multiple content events over a period of time along the media stream and, based on those multiple analyses, could compute an average or other representative measure of the schedule drift as to that media stream.

In line with the discussion above, the event manager 216 could start to compute this schedule drift when a trigger condition occurs.

By way of example, the ad recognizer 206 could monitor for a situation where the ad recognizer 214 has not detected the presence of a replaceable ad in the media stream for at least a defined threshold duration deemed to be so long that a schedule-drift problem is likely to exist. This defined threshold duration, for instance, could be established based on the ad recognizer's typical rate of detecting of replaceable ads. For instance, if the ad recognizer 214 tends to detect presence of a replaceable ad in the media stream on average at least every 30 minutes, and if 2 hours have passed since the ad recognizer 214 last detected presence of a replaceable ad in the media stream, the ad recognizer 214 could deem that to be a problem situation. In response to detecting this situation, the ad recognizer 214 could then signal to the event manager 216 to cause the event manager 216 to start analyzing for the presence of schedule drift as noted above.

Note also that the trigger condition could likewise or more generally be that the ad recognizer 214 has been detecting presence of ads at a rate sufficiently lower than the ad recognizer's typical rate of detecting replaceable ads, even if not that the ad recognizer has not detected any such ads for a threshold period of time.

As another example, a trigger condition for the event manager's schedule-drift analysis could be mere passage of time. For instance, the event manager 216 could BE configured to periodically perform the analysis to compute schedule drift. Other trigger conditions for this analysis could be possible as well.

Upon determining the extent of schedule drift, the event manager 216 could then apply an offset as noted above, to help better align the scheduled time of ad presence in the media stream with the actual time of ad presence in the media stream. As indicated above, this offset could be a time bias that helps to reverse the schedule drift. For instance, if the event manager 216 determines that content events have been occurring in the media stream 15 minutes earlier than the schedule indicates, the event manager 216 could change scheduled times of ads in the media stream to be 15 minutes earlier than the schedule data indicates. Further or alternatively, the event manager 216 could apply a similar change to help manage handling of content events other than or in addition to ad presence as well.

Application of this time offset as to replaceable ads could take various forms as noted above.

For instance, application of the time offset could involve generating revised schedule data including the ad timing changed by the offset, and providing the revised schedule for reference by the ad recognizer 214. Thus, if the event manager 216 operates to pass along to the ad recognizer 214 the scheduled times of presence of ads in the media stream as indicated by content-programmer-provided schedule data, the event manager 216 could offset those scheduled times by the computed time offset and could instead provide to the ad recognizer 214 the offset scheduled times of ad presence.

Alternatively, application of the time offset could be done by the ad recognizer 214. For instance, the event manager 216 could signal to the ad recognizer 214, providing the ad recognizer 214 with the latest computed time offset on a per media stream basis. And the ad recognizer 214 could then apply that time offset as to ads in an associated media stream, to establish offset scheduled times of ad presence in that media stream.

In either case, the scheduled times of ad presence that the ad recognizer 214 then uses as a basis to guide when the ad recognizer monitors for presence of replaceable ads could be more in line with the actual timing of ad presence. And so the ad recognizer 214 may more likely detect the presence of replaceable ads.

Optimally as noted above, this correcting of schedule drift may thus provide financial benefit by helping to ensure successful performance of valuable ad replacement. Further, correcting schedule drift may help to avoid replacing the wrong instance of a given ad, such as where the same ad appears another time in the same media stream and where the schedule drift causes the ad-recognizer to erroneously detect that other instance of the ad rather than the intended instance of the ad.

Figure 3:
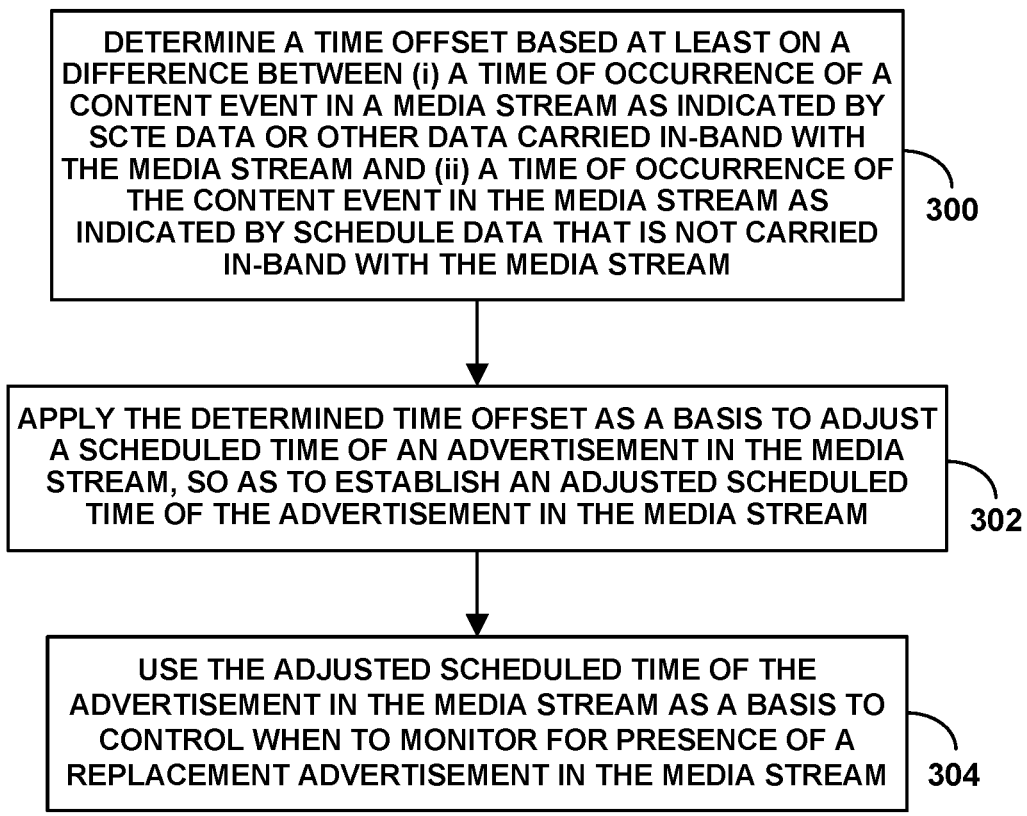
FIG. 3 is a flow chart depicting a method that could be carried out in accordance with the disclosure.

FIG. 3 is next a flow chart depicting an example method that can be carried out in accordance with the present disclosure. As shown in FIG. 3, at block 300, the method includes determining a time offset based at least on a difference between (i) a time of occurrence of a content event in a media stream as indicated by SCTE data or other data carried in-band with the media stream and (ii) a time of occurrence of the content event in the media stream as indicated by schedule data that is not carried in-band with the media stream. Further, at block 302, the method includes applying the determined time offset as a basis to adjust a scheduled time of an advertisement in the media stream, so as to establish an adjusted scheduled time of the advertisement in the media stream. And at block 304, the method includes using the adjusted scheduled time of the advertisement in the media stream as a basis to control when to monitor for presence of a replacement advertisement in the media stream.

In line with the discussion above, this method, along with any accompanying features, could be carried out by a computing system, which could comprises one or more of the entities shown in FIG. 2, among other possibilities. For instance, as noted above, the computing system could comprise the element manager 216, the ad recognizer 214, and the fingerprint engine 208. Other implementations could be possible as well.

As noted above, an example implementation of this method could additionally include determining the time of occurrence of the content event in the media stream as indicated by the data carried in-band with the media stream, to facilitate the determining of the time offset. And the act of determining the time of occurrence of the content event in the media stream as indicated by the data carried in-band with the media stream could involve detecting the data carried in-band with the media stream and determining from the detected data the time of occurrence of the content event in the media stream as indicated by the detected data. For instance, the fingerprint engine 208 could read that in-band data and publish it to a database from which the event manager 216 could determine the data.

In addition, as noted above, an example implementation could involve determining the time of occurrence of the content event in the media stream as indicated by the schedule data that is not carried in-band with the media stream, to facilitate the determining of the time offset. For instance, the schedule data could be provided directly or indirectly by at least one content programmer, and the act of determining the schedule data could involve receiving and reading that schedule data.

Still further, as discussed above, the content event whose timing forms a basis for computing the time offset could be any of the types of content events noted above, such as (i) an advertisement-break start, (ii) an advertisement-break end, (iii) an advertisement start, (iv) an advertisement end, (v) a program start, and (v) a program end, among other possibilities.

And as noted above, multiple content events could occur in the media stream, and the act of determining the time offset could be based at least on multiple differences, each being between (i) a time of occurrence of a respective one of the multiple content events in the media stream as indicated by the data carried in-band with the media stream and (ii) a time of occurrence of the respective one the multiple content events in the media stream as indicated by the schedule data that is not carried in-band with the media stream. And the act of determining the time offset based at least on those multiple differences could then involve determining the time offset based at least on an average or other statistically rolled-up representation of the multiple differences.

Still further, as discussed above, the method could involve detecting a trigger condition for the determining of the time offset, and the determining of the time offset being responsive to at least detecting the trigger condition. And detecting the trigger condition could involve detecting absence of advertisement-detection in the media stream for at least a defined threshold period of time. Further, the method could involve setting that defined threshold period (as a point of comparison for the method) based on an historic rate of advertisement detection.

Yet further, the act of using the adjusted scheduled time of the advertisement in the media stream as a basis to control when to monitor for presence of a replacement advertisement in the media stream could involve (a) based on the adjusted scheduled time, setting a range of time surrounding the adjusted scheduled time, with the set range of time extending from a start time to an end time and (b) based on the set range of time, (i) starting to monitor for replacement-advertisement presence in the media stream at the start time and (ii) stopping the monitoring for replacement-advertisement presence in the media stream at the end time.

Figure 4:
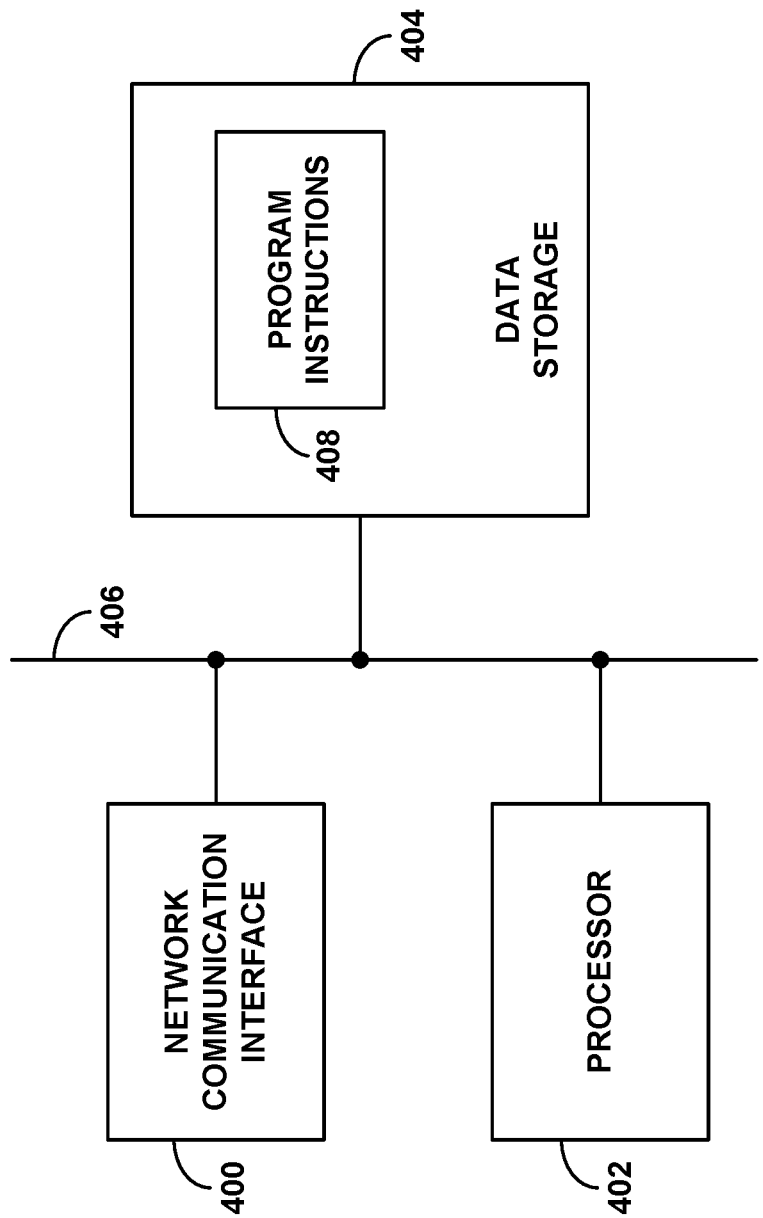
FIG. 4 is a simplified block diagram of an example computing system that could operate in accordance with the disclosure.

FIG. 4 is a simplified block diagram of an example computing system that could represent any of the various entities discussed above, alone or in combination. As shown in FIG. 4, the example computing system could include at least one network communication interface 400, at least one processor 402, and at least one instance of non-transitory data storage 404, any or all of which could be integrated together in various ways or, as shown, communicatively linked together by one or more system buses, networks, and/or other connection mechanisms 406.

Each network communication interface 400 could comprise one or more network connection mechanisms to facilitate communication on one or more networks, such as one or more LANs and/or one or more WANs, and/or for engaging in direct or networked communication with one or more other local or remote entities. As such, the network communication interface 400 could comprise a wireless or wired Ethernet interface or other type of network interface, for engaging in IP communication and/or other type of network communication, as well as network communication program logic for supporting such communication.

Each processor 402 could comprise one or more general purpose processors (e.g., microprocessors) and/or one or more specialized processors (e.g., application specific integrated circuits). And each instance of non-transitory data storage unit 404 could comprise one or more volatile and/or non-volatile storage components, such as optical, magnetic, or flash storage. As shown, the non-transitory data storage 404 could then store program instructions 408, which could be executable by any of the one or more processors 402 to carry out various operations described herein.

Various other features described herein could be implemented in this context as well, and vice versa.

Figure 5:
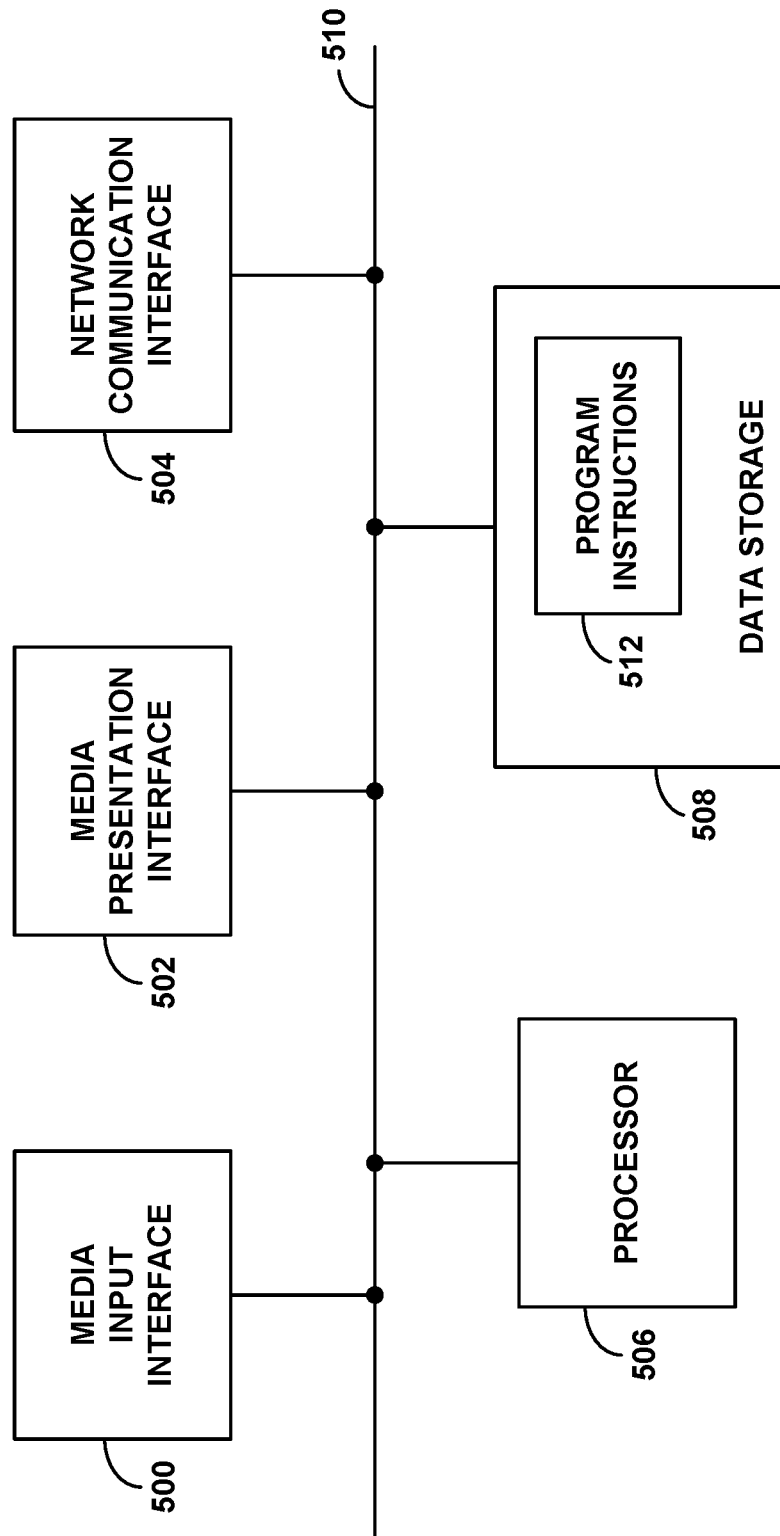
FIG. 5 is a simplified block diagram of an example media client that could operate in accordance with the disclosure.

Finally, FIG. 5 is a simplified block diagram of an example media client. In line with the discussion above, this media client could take various forms noted above, among other possibilities. And as shown in FIG. 5, the example media client includes at least one media input interface 500, at least one media presentation interface 502, at least one network communication interface 504, at least one processor 506, and at least one non-transitory data storage 508, any or all of which could be integrated together or, as shown, communicatively linked together by a system bus, network, or other connection mechanism 510.

The at least one media input interface 500 could comprise a physical communication interface for receiving media content to be processed for presentation. As such, the at least one media input interface could include one or more wired and/or wireless interfaces for establishing communication with and receiving media content in analog or digital form from a receiver or other device or system. For example, a media input interface could include one or more interfaces compliant with protocols such as DVI, HDMI, VGA, USB, BLUETOOTH, WIFI, Ethernet, among numerous others.

The at least one media presentation interface 502 could then comprise one or more components to facilitate presentation of the received media content if applicable. By way of example, the at least one media presentation interface 502 could comprise a user interface such as a display screen, as well as one or more drivers or other components for processing the received media content to facilitate presentation of the content on the user interface.

The at least one network communication interface 504 could comprise a physical network connection mechanism to facilitate communication on one or more networks, and/or for engaging in direct or networked communication with one or more other local or remote entities. As such, the at least one network communication interface 504 could comprise a wireless or wired Ethernet interface or other type of network interface, for engaging in IP communication and/or other type of network communication.

Further, the at least one processor 506 could comprise one or more general purpose processors (e.g., microprocessors) and/or one or more specialized processors (e.g., application specific integrated circuits). And the at least one non-transitory data storage 508 could comprise one or more volatile and/or non-volatile storage components, such as optical, magnetic, or flash storage. Further, as shown, data storage 508 could store program instructions 512, which could be executable by at least one processor 506 to carry out various operations described herein.

Various other features described above could be implemented in this context as well, and vice versa.

The present disclosure also contemplates a non-transitory computer readable medium that is encoded with, stores, or otherwise embodies program instructions executable by one or more processors to carry out various described operations.

Exemplary embodiments have been described above. Those skilled in the art will understand, however, that changes and modifications may be made to these embodiments without departing from the true scope and spirit of the invention.

What is claimed is:

1. A method comprising:
    determining a time offset based at least on a difference between (i) a time of occurrence of a content event in a media stream as indicated by data carried in-band with the media stream and (ii) a time of occurrence of the content event in the media stream as indicated by schedule data that is not carried in-band with the media stream;
    applying the determined time offset as a basis to adjust a scheduled time of an advertisement in the media stream, so as to establish an adjusted scheduled time of the advertisement in the media stream; and
    using the adjusted scheduled time of the advertisement in the media stream as a basis to control when to monitor for presence of a replacement advertisement in the media stream.

2. The method of claim 1, further comprising determining the time of occurrence of the content event in the media stream as indicated by the data carried in-band with the media stream, to facilitate the determining of the time offset.

3. The method of claim 1, further comprising determining the time of occurrence of the content event in the media stream as indicated by the schedule data that is not carried in-band with the media stream, to facilitate the determining of the time offset.

4. The method of claim 1, wherein the content event comprises an event selected from the group consisting of (i) an advertisement-break start, (ii) an advertisement-break end, (iii) an advertisement start, (iv) an advertisement end, (v) a program start, and (v) a program end.

5. The method of claim 1, wherein a plurality of content events occur in the media stream, and wherein determining the time offset is based at least on a plurality of differences each between (i) a time of occurrence of a respective one of the plurality of content events in the media stream as indicated by the data carried in-band with the media stream and (ii) a time of occurrence of the respective one the plurality of content events in the media stream as indicated by the schedule data that is not carried in-band with the media stream.

6. The method of claim 1, wherein determining the time offset based at least on the plurality of differences comprises determining the time offset based at least on an average of the plurality of differences.

7. The method of claim 1, further comprising:
    detecting a trigger condition for the determining of the time offset, wherein determining the time offset is responsive to at least detecting the trigger condition.

8. The method of claim 1, wherein using the adjusted scheduled time of the advertisement in the media stream as a basis to control when to monitor for presence of a replacement advertisement in the media stream comprises:
    based on the adjusted scheduled time, setting a range of time surrounding the adjusted scheduled time, wherein the set range of time extends from a start time to an end time; and
    based on the set range of time, (i) starting to monitor for replacement-advertisement presence in the media stream at the start time and (ii) stopping the monitoring for replacement-advertisement presence in the media stream at the end time.

9. The method of claim 2, wherein the data carried in-band with the media stream comprises Society of Cable and Telecommunications Engineers (SCTE) data.

10. The method of claim 2, wherein determining the time of occurrence of the content event in the media stream as indicated by the data carried in-band with the media stream comprises detecting the data carried in-band with the media stream and determining from the detected data the time of occurrence of the content event in the media stream as indicated by the detected data.

11. The method of claim 3, wherein the schedule data is provided by at least one content programmer.

12. The method of claim 7, wherein detecting the trigger condition comprises detecting absence of advertisement-detection in the media stream for at least a defined threshold period of time.

13. The method of claim 12, further comprising setting the defined threshold period of time based on historic rate of advertisement detection.

14. A computing system comprising:
    at least one processor;
    at least one non-transitory data storage; and
    program instructions stored in the at least one non-transitory data storage and executable by the at least one processor to carry out operations including:
        determining a time offset based at least on a difference between (i) a time of occurrence of a content event in a media stream as indicated by data carried in-band with the media stream and (ii) a time of occurrence of the content event in the media stream as indicated by schedule data that is not carried in-band with the media stream, applying the determined time offset as a basis to adjust a scheduled time of an advertisement in the media stream, so as to establish an adjusted scheduled time of the advertisement in the media stream, and using the adjusted scheduled time of the advertisement in the media stream as a basis to control when to monitor for presence of a replacement advertisement in the media stream.

15. The computing system of claim 14, wherein a plurality of content events occur in the media stream, and wherein determining the time offset is based at least on a plurality of differences each between (i) a time of occurrence of a respective one of the plurality of content events in the media stream as indicated by the data carried in-band with the media stream and (ii) a time of occurrence of the respective one the plurality of content events in the media stream as indicated by the schedule data that is not carried in-band with the media stream.

16. The computing system of claim 14, wherein the operations additionally include detecting a trigger condition for the determining of the time offset, wherein determining the time offset is responsive to at least detecting the trigger condition, and wherein detecting the trigger condition comprises detecting absence of advertisement-detection in the media stream for at least a defined threshold period of time.

17. The computing system of claim 14, wherein using the adjusted scheduled time of the advertisement in the media stream as a basis to control when to monitor for presence of a replacement advertisement in the media stream comprises:

based on the adjusted scheduled time, setting a range of time surrounding the adjusted scheduled time, wherein the set range of time extends from a start time to an end time; and based on the set range of time, (i) starting to monitor for replacement-advertisement presence in the media stream at the start time and (ii) stopping the monitoring for replacement-advertisement presence in the media stream at the end time.

18. At least one non-transitory computer-readable medium embodying program instructions executable by at least one processor to carry out operations comprising:

determining a time offset based at least on a difference between (i) a time of occurrence of a content event in a media stream as indicated by data carried in-band with the media stream and (ii) a time of occurrence of the content event in the media stream as indicated by schedule data that is not carried in-band with the media stream;

applying the determined time offset as a basis to adjust a scheduled time of an advertisement in the media stream, so as to establish an adjusted scheduled time of the advertisement in the media stream; and using the adjusted scheduled time of the advertisement in the media stream as a basis to control when to monitor for presence of a replacement advertisement in the media stream.

19. The at least one non-transitory computer-readable medium of claim 18, wherein a plurality of content events occur in the media stream, and wherein determining the time offset is based at least on a plurality of differences each between (i) a time of occurrence of a respective one of the plurality of content events in the media stream as indicated by the data carried in-band with the media stream and (ii) a time of occurrence of the respective one the plurality of content events in the media stream as indicated by the schedule data that is not carried in-band with the media stream.

20. The at least one non-transitory computer-readable medium of claim 18, wherein the operations additionally comprise detecting a trigger condition for the determining of the time offset, wherein determining the time offset is responsive to at least detecting the trigger condition, and wherein detecting the trigger condition comprises detecting absence of advertisement-detection in the media stream for at least a defined threshold period of time.

\* \* \* \* \*

UNITED STATES PATENT AND TRADEMARK OFFICE
CERTIFICATE OF CORRECTION

PATENT NO.        : 11,695,972 B2
APPLICATION NO.   : 17/305613
DATED             : July 4, 2023
INVENTOR(S)       : Gutierrez et al.

It is certified that error appears in the above-identified patent and that said Letters Patent is hereby corrected as shown below:

In the Specification

In Column 5, Lines 6-7, delete "possibilities" and insert -- possibilities. --, therefor.

In Column 8, Line 49, delete "216." and insert -- 220. --, therefor.

In Column 9, Line 1, delete "204," and insert -- 202, --, therefor.

In Column 11, Line 44, delete "216" and insert -- 220 --, therefor.

In Column 13, Line 45, delete "206" and insert -- 214 --, therefor.

Signed and Sealed this
Twelfth Day of September, 2023

Katherine Kelly Vidal
*Director of the United States Patent and Trademark Office*